(12) United States Patent
Cen et al.

(10) Patent No.: US 9,027,089 B2
(45) Date of Patent: *May 5, 2015

(54) METHOD AND SYSTEM FOR PROVIDING INTERNET SERVICES

(71) Applicant: Alibaba Group Holding Limited, George Town (KY)

(72) Inventors: Wenchu Cen, Hangzhou (CN); Lin Wang, Hangzhou (CN); Jin Zhao, Hangzhou (CN); Seshu Zheng, Hangzhou (CN); Yi Zeng, Hangzhou (CN)

(73) Assignee: Alibaba Group Holding Limited (KY)

( * ) Notice: Subject to any disclaimer, the term of this patent is extended or adjusted under 35 U.S.C. 154(b) by 219 days.

This patent is subject to a terminal disclaimer.

(21) Appl. No.: 13/870,390

(22) Filed: Apr. 25, 2013

(65) Prior Publication Data

US 2013/0276071 A1    Oct. 17, 2013

Related U.S. Application Data

(63) Continuation of application No. 12/459,005, filed on Jun. 25, 2009, now Pat. No. 8,453,209.

(30) Foreign Application Priority Data

Jun. 26, 2008    (CN) .......................... 2008 1 0126113

(51) Int. Cl.
*G06F 7/04*      (2006.01)
*G06F 15/16*     (2006.01)
(Continued)

(52) U.S. Cl.
CPC .............. *G06F 21/44* (2013.01); *G06F 21/30* (2013.01); *G06F 21/62* (2013.01); *H04L 63/08* (2013.01);
(Continued)

(58) Field of Classification Search
CPC ......... G06F 21/30; G06F 21/44; G06F 21/62; H04L 63/08; H04L 63/0884; H04L 63/105
USPC ............... 726/2–21, 26, 27, 29; 709/227–229
See application file for complete search history.

(56) References Cited

U.S. PATENT DOCUMENTS 7,320,141 B2 *   1/2008   Hemsath et al. ................. 726/21
7,603,469 B2 *  10/2009   Fletcher et al. ............... 709/229

(Continued)

FOREIGN PATENT DOCUMENTS

| JP | 2005011098 | 1/2005 |
| JP | 2006072904 | 3/2006 |
| JP | 2006127222 | 5/2006 |

*Primary Examiner* — Jeffrey Pwu
*Assistant Examiner* — Jayesh Jhaveri
(74) *Attorney, Agent, or Firm* — Van Pelt, Yi & James LLP

(57) ABSTRACT

A service integration platform system for providing Internet services includes: an interface configured to receive a service request message that is initiated by a user of an application provided by an Independent Software Vendor (ISV), the service request message being implemented according to an Application Programming Interface (API) type and including a plurality of platform-level parameters that conform to the API type. The system further includes one or more processors coupled to the interface, configured to: locate a set of authentication checks that are appropriate for the API type, based at least in part on the plurality of platform-level parameters included in the service request message and a mapping of predefined combinations of platform-level parameters and corresponding sets of authentication checks; perform authentication of the service request according to the set of authentication checks; and route the service request to a service address of the Internet Service Provider (ISP) in the event that the service request is authenticated.

26 Claims, 5 Drawing Sheets

(51) Int. Cl.
*G06F 17/30* (2006.01)
*H04L 29/06* (2006.01)
*G06F 21/44* (2013.01)
*H04L 29/08* (2006.01)
*G06F 21/30* (2013.01)
*G06F 21/62* (2013.01)

(52) U.S. Cl.
CPC .......... *H04L 63/0884* (2013.01); *H04L 63/105* (2013.01); *H04L 63/12* (2013.01); *H04L 63/205* (2013.01); *H04L 67/16* (2013.01); *H04L 69/28* (2013.01)

(56) References Cited

U.S. PATENT DOCUMENTS

| | | | |
|---|---|---|---|
| 7,640,348 B2* | 12/2009 | Atwal et al. | 709/229 |
| 7,657,924 B2 | 2/2010 | Hondo et al. | |
| 8,631,464 B2* | 1/2014 | Belakhdar et al. | 726/3 |
| 2005/0044188 A1* | 2/2005 | Nakazawa et al. | 709/219 |
| 2006/0021019 A1* | 1/2006 | Hinton et al. | 726/10 |
| 2006/0143440 A1* | 6/2006 | Ponnapalli et al. | 713/155 |
| 2007/0118878 A1* | 5/2007 | Sastry et al. | 726/3 |
| 2007/0208864 A1* | 9/2007 | Flynn et al. | 709/227 |
| 2009/0328181 A1* | 12/2009 | Ye et al. | 726/9 |
| 2010/0049790 A1* | 2/2010 | Schreiber | 709/203 |

\* cited by examiner

METHOD AND SYSTEM FOR PROVIDING INTERNET SERVICES

CROSS REFERENCE TO OTHER APPLICATIONS

This application is a continuation of co-pending U.S. patent application Ser. No. 12/459,005, entitled METHOD AND SYSTEM FOR PROVIDING INTERNET SERVICES filed Jun. 25, 2009 which is incorporated herein by reference in its entirety for all purposes, which claims priority to PRC Patent Application No. 200810126113.0 entitled A METHOD FOR PROVIDING INTERNET SERVICES AND A SERVICE INTEGRATION PLATFORM SYSTEM filed Jun. 26, 2008 which is incorporated herein by reference in its entirety for all purposes.

FIELD OF THE INVENTION

The present invention relates to network application, particularly to a method for providing Internet services and a service integration platform system.

BACKGROUND OF THE INVENTION

As Service-Oriented Architecture (SOA) becomes more and more mature and Representational State Transfer (REST) style becomes more and more popular, Internet services offerings are on the rise. Traditional Internet software corporations also begin to try new roles. Internet Service Providers (ISPs) as service providers start to open their service resources and make internal data available to the public, so as to provide a new open mode for the development of websites. In the meantime, diverse application of Web 2.0 also brings up lots of Independent Software Vendors (ISVs) which, in considering customer demands, take advantage of available service resources in networks to design various interactive applications, incorporate services provided by different service providers to generate innovative software products.

This service-oriented new developing mode is also proposed due to innovative nature of Internet applications, which often update rapidly. In successful cases of some big websites, ISV developers develop applications to those websites with open Application Program Interfaces (APIs) to attract users. Existing websites that offer open APIs typically have an inflexible security model since they usually address only a single ISP.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
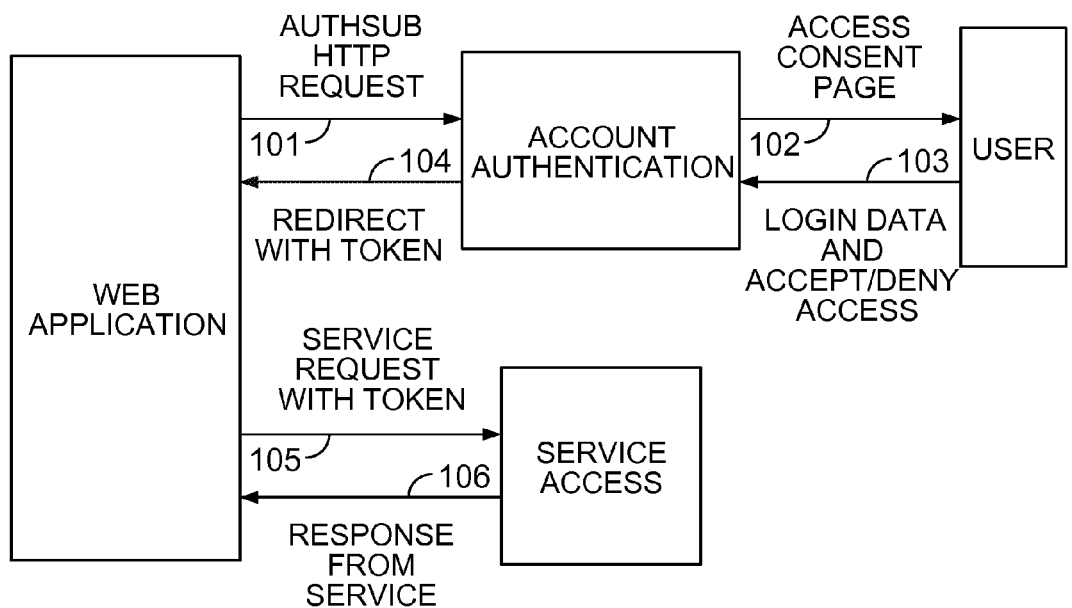
FIG. 1 is a schematic illustration of an implementation of a typical security control program.

FIG. 1 is a schematic illustration of an implementation of a typical security control program. In this example, the security control program for the typical Open Application Program Interfaces (Open APIs) mainly deals with ISV application requests for obtaining User's information through the Application Program Interfaces (APIs).

In step 101, a web application sends an AuthSub Hypertext Transport Protocol (HTTP) request to an account authentication proxy server. When the Web Application needs to access a service related to user information, an AuthSub request is generated and sent to the account authentication proxy server.

In step 102, the account authentication proxy server presents an access consent page to a user of the web application. An application server will confirm whether to authorize the application to obtain user information through the APIs. In the meantime, if this is the first time the user tries to access the application, a login operation is prompted.

In step 103, the user returns login data. If access is denied, then a default page is returned instead of the application page.

In step 104, the account authentication proxy server returns a redirect with a token specific to the web application. If the user is authorized to access the application, then authentication services will be redirected to the application page, and the token is used as user identification.

In step 105, the web application sends a service request with the token to a service access server. The application uses the token/user identification to request for service. The service access server will accept the request after checking the token.

Step 106, the service access server returns service call results (i.e., response from the service) to the web application after processing.

With respect to token management, the site has two types of limitations on the token. One type of limitation is the scope of use. An independent token is to be applied for every service. The other type of limitation is the valid period for use. Tokens are classified into one-time use tokens and session tokens. The former can be used only once and the latter can be used multiple times.

Currently existing security strategies address only single ISP situations. For example, the existing website requires sending dedicated AuthSub requests. Because the security strategy only addresses situations involving a single ISP, it is relatively inflexible and will not be able to accommodate multiple ISPs easily.

Furthermore, each service of an ISP needs to maintain a token, which will increase the complexity and the cost of ISV application development. Furthermore, the whole set of ISP security strategies also need to be known, which will increase the load burden of the ISV.

In some embodiments, a set of security strategies are designed to reduce the complexity of ISV application development. Specifically, APIs provided by an ISP are classified based on security level first and then corresponding security authentication contents are set according to the classification. Finally, security authentication is performed according to content of platform-level parameters. Thus, when an ISV needs to request for ISP services, the request only needs to carry corresponding parameters to obtain corresponding security services. As such, security strategies are transparent to the ISV. In the meantime, an ISP only needs to provide APIs and security demands to perform corresponding security authentication on an ISV request, so that the ISP can focus on business service interface development without having to consider security strategy architecture. Now the specific embodiments will be illustrated with reference to the accompanying drawings.

Figure 2:
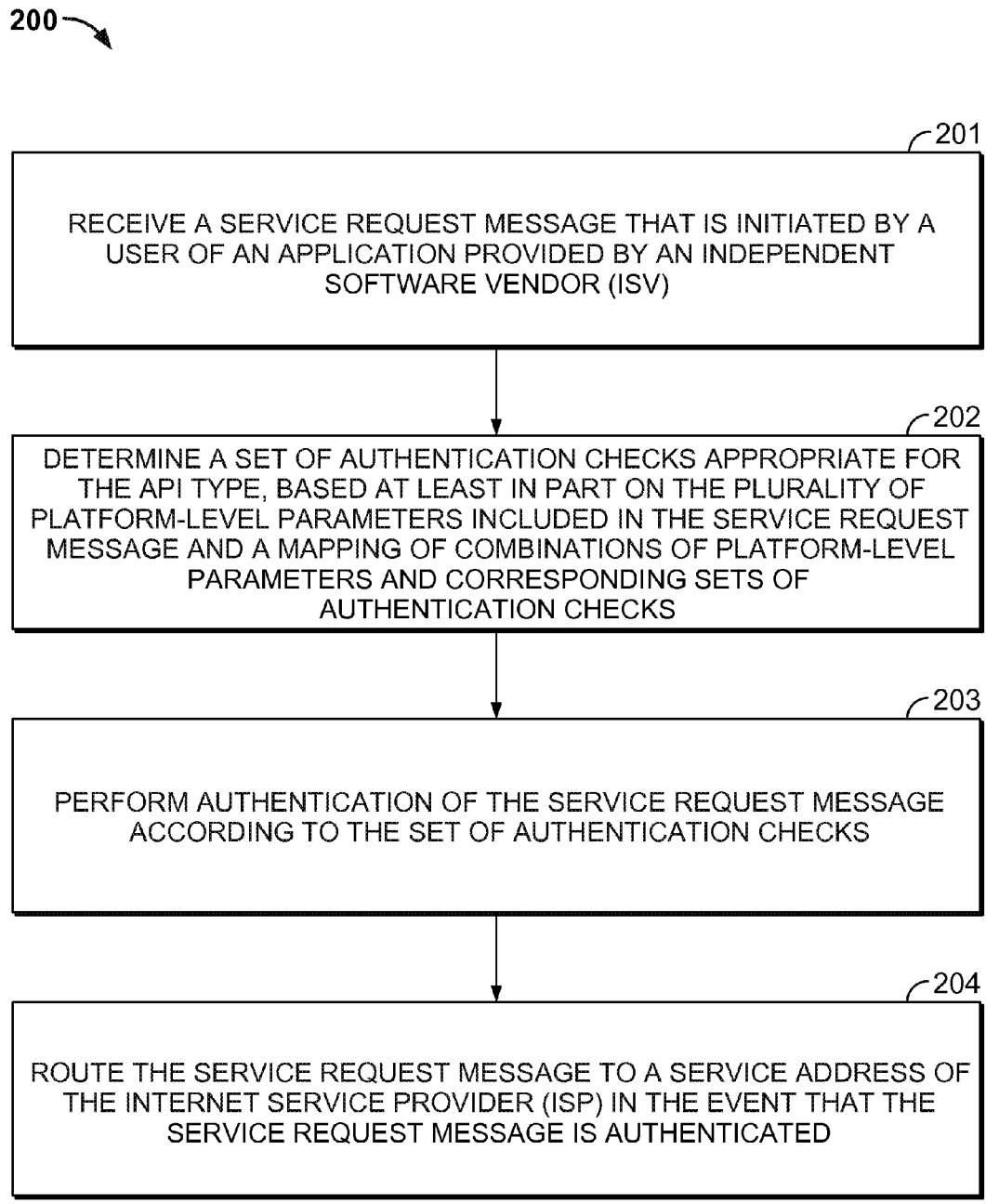
FIG. 2 is a flowchart illustrating an embodiment of a process for providing Internet services.

FIG. 2 is a flowchart illustrating an embodiment of a process for providing Internet services. Process 250 may be implemented on a system such as system 500 of FIG. 5 below.

At 201, a service request message is received, for example, on a communications interface of a Service Integration Platform (SIP) server, from a user of an application provided by an ISV. The service request message is sent to an ISP, requesting an ISV application. The service request message is implemented according to an API type and includes a set of platform-level parameters that conform to the API type.

At 202, a set of authentication checks appropriate for the API type are determined. In some embodiments, different API types and their respective authentication checks are defined by the ISP. The information is stored on the SIP, allowing the SIP to look up the API of the service request and make a determination of the appropriate authentication checks upon receiving the service request.

At 203, authentication of the service request message is performed according to the set of authentication checks determined.

At 204, the service request message is routed to a service address of the Internet Service Provider (ISP) in the event that the service request message is authenticated.

Specific implementation of the above steps will be described in the following. Description will refer to constructing security strategies in the present application, namely classification of service security levels, definition of platform-level parameters, security control and relations there between will be described.

I. Classification of Service Security Levels

The basis for security strategy control flow is to classify service security levels. Security relates to two aspects: service access control and service business security level.

Service access control determines whether the use of certain services should be authenticated by an ISP. The ISP may establish, for example, that the use of high level services requires authentication. The SIP in turn may determine whether to route services for request to access this kind of services according to the authentication result.

In some embodiments, according to security demands, the service API types in Step 201 can include one or more of the following types:

Anonymous access service: anonymous access service type does not require any authentication.

Authorized service: authorized service type requires signature check and timestamp check;

User authorized service: user authorized service type requires signature check, timestamp check and user identity check;

Optional user authorized service: optional user authorized service type requires signature check, timestamp check and optional user identity check.

The service API is provided by the ISP. An example showing APIs with different service levels is illustrated in the following table:

| Service Level | Security | API Type | Description |
| --- | --- | --- | --- |
| Anonymous access service | very low | 0 | Does not require any authentication. |
| Authorized service | low | 1 | Requires signature check and timestamp check. Does not require user binding. |
| User authorized service | high | 2 | Every service invoking the API requires signature check, time stamp check and user binding. |
| Optional user authorized service | middle | 3 | Part of service invoking the API requires signature check and time stamp check and user binding is optional. |

For an optional user authorized service, whether the service requires binding user information is optional. If user information is bound, same service interface will return user-specific private information. If user information is not bound, only public information is returned.

Correspondingly, in order to achieve the security strategy control flow, a set of authentication checks determined in step 202 may include signature check, timestamp check and user identity check, or a combination of the checks. For example, if a GetUser service request is determined to be an API type of user authorized service, the set of authentication checks would include signature check, time stamp check, and user identity check.

Corresponding authentication demands can be provided in combination with the above API types. Correspondence relationship between each kind of services and authentication in the security strategy can be as shown in the following table:

| Service Level | Signature Check | Timestamp Check | User Identity Check |
| --- | --- | --- | --- |
| Anonymous access service | not needed | not needed | not needed |
| Authorized service | needed | needed | not needed |
| Optional user authorized service | needed | needed | optional |
| User authorized service | needed | needed | needed |

II. Definition of Platform-Level Parameters

An ISV's request to invoke a service requires two sets of data: platform-level parameters and business parameters. Business parameters are service interface parameters provided by each ISP and are specific to the application. Platform-level parameters are configuration parameters for locating an ISP service and required by security flow. Platform-level parameters are related to the implementation described in the present application, which includes, for example, identity proof for invoking the ISV service (such as a key or a certificate), service name, service request timestamp, signature, user session unique ID in an ISV application and type of returned value, or a combination of the parameters.

Example platform-level parameters related to security control and authentication are shown in the following table:

| Name | Type | Necessary or Optional | Description |
|---|---|---|---|
| sip_appkey | Varchar (20) | necessary | Appkey of ISV application |
| sip_apiname | Varchar (20) | necessary | Service name |
| sip_timestamp | Varchar (19) | optional | Service request timestamp (yyyy-mm-dd hh:mi:ss) |
| sip_sign | Varchar (19) | optional | Signature (including generating signatures for the above three necessary parameters and all business parameters based on signature rules) |
| sip_sessionid | Varchar (20) | optional | User session unique identity in ISV application |
| sip_format | Varchar (4) | optional | Define type of returned value json/xml |

Symbols in the 'name' column will be used in the following embodiments and represent platform-level parameters; 'Varchar' shows length of a character variable; 'Necessary or Optional' means whether the parameter belongs to a parameter that must be carried. 'json/xml' is the format of returned content.

Appkey of ISV application in the table refers to the proof of identity for invoking an ISV service.

Therefore, classification based on service level in combination with the above service API types can determine platform-level parameters needed to be carried. That is, different security level services can be determined by carrying different platform-level parameters. Specifically, this can be as shown in the following table:

| Name | Type | Necessary or Optional | Description |
|---|---|---|---|
| Anonymous access service: do not need any authentication | | | |
| sip_appkey | Varchar (20) | necessary | |
| sip_apiname | Varchar (20) | necessary | |
| Authorized service: need signature check (user binding not needed) | | | |
| sip_appkey | Varchar (20) | necessary | |
| sip_apiname | Varchar (20) | necessary | |
| sip_timestamp | Varchar (19) | necessary | |
| sip_sign | Varchar (19) | necessary | |
| sip_sessionid | Varchar (20) | necessary | |
| Need user binding | | | |
| sip_appkey | Varchar (20) | necessary | |
| sip_apiname | Varchar (20) | necessary | |
| sip_timestamp | Varchar (19) | necessary | |
| sip_sign | Varchar (19) | necessary | |
| sip_sessionid | Varchar (20) | necessary | |
| Optional user binding | | | |
| sip_appkey | Varchar (20) | necessary | |
| sip_apiname | Varchar (20) | necessary | |
| sip_timestamp | Varchar (19) | necessary | |
| sip_sign | Varchar (19) | necessary | |

| Name | Type | Necessary or Optional | Description |
|---|---|---|---|

According to the table above, in some embodiments, a service request can be authenticated according to the platform-level parameters included in the request, so as to meet security demands. Specifically:

For an anonymous service, the platform-level parameters are: identity proof for invoking ISV service and service name. No signature check and user identity check are performed on the service request.

For an authorized service that requires no user binding, the platform-level parameters are: identity proof for invoking ISV service, service name, service request timestamp and signature. Checks that are performed on the service request are signature check, timestamp check and user identity check.

For a user authorized service that requires user binding, the platform-level parameters are: identity proof for invoking ISV service, service name, service request timestamp, signature and user session unique identity in an ISV application. Checks performed on the service request are signature check, timestamp check and user identity check.

For an optional user authorized service with optional user binding, the platform-level parameters are: identity proof for invoking ISV service, service name, service request timestamp and signature and user binding is optional. Checks that are performed on the service request are signature check, timestamp check and optional user identity check.

III. Security Control

In some embodiments, a service integration platform system (referred to as an SIP) is used for implementing security strategy control. An embodiment of an SIP implements the following functions: (1) issuance of identity proof (Appkey) for invoking an ISV service; (2) signature computation; (3) timestamp check; and (4) encryption. Example implementations are described below.

(1) Issuance of Identity Proof (Appkey) for Invoking an ISV Service.

In specific implementation, an ISV Portal for managing the ISV and issuing an AppKey and an AppSecret is included in a Service Integration Platform (i.e. SIP) system. After registering an application in the ISV Portal, a set of AppKey and AppSecret is issued to the ISV. The AppKey is the identity proof of the ISV to invoke ISP services and cannot be modified; the AppSecret is a key for accessing an API and can be modified by the ISV automatically in the ISV Portal. The relationship between the AppKey and the AppSecret is similar to that between a login account and a password. Both of them are used in signature and business parameters.

For an example showing properties of AppKey, see sip_appkey in the above table. The AppSecret is selected and modified according to user demands.

(2) Implementation of Signature

The signature can be authenticated by the Service Integration Platform system. An ISP does not need signature authentication. An ISV should sign for all submitted parameters except sip_sign. Signed parameters include platform-level parameters and business parameters, which may be used to compute a digital signature.

A sip_sign parameter shall be generated before an ISV application invokes an API from an SIP. In some embodiments, sip_sign is generated as follows:

sip_sign=MD5 (concatenate with the sig_appsecret into a string ( concatenate arrays to generate a character string (
    Sort the arrays in alphabetical order (
        Non URL coded character string arrays in the form of <key><value> for all parameters except sip_sign))))
wherein:
sip_sign=MD5 (sip_appsecret+[param1+value1 ... paramn+valuen]). The parameters are sorted in alphabetical order.

For example, given that sip_appkey=001, and sip_appsecret=a312, the API is defined as getUserListByCondition (String company, boolean isdeleted, int count), and is invoked as follows: getUserListByCondition ("alisoft", false, 10), a signature is determined through the following approach:

(a) Sort the interface approach parameter values in alphabetical order according to parameter names and connect the sorted parameters as follows:
    Company+alisoft+count+10+isdeleted+false (b) Add the character string before the secretCode of the approach obtaining the final signature (herein provided appSecret is a312):
    sip_sign=MD5 (a312companyalisoftcount10isdeletedfalse).

(3) Implementation of Timestamp Check

Each request is signed with the current time using a signature function, so that the service integration platform system can check the timestamp upon receiving the signature to determine whether the request has timed out to prevent information from being repeatedly sent.

(4) Implementation of Encryption

The encryption function herein is used in the course of generating a user token. Because the token is only authenticated by the SIP platform itself, symmetry encryption with higher efficiency is used and the key is changed periodically. In one example, sip_usertoken is implemented as:
sip_usertoken=DES (appkey=$sip_appkey, ispid=$ispid, userid=$username, timestamp=$timestamp, type=(0|1))

Parameters in the above equation are described as follows:

| Parameter Name | Value | Description |
| --- | --- | --- |
| appkey | Request parameter value: sip_appkey | Identity proof for invoking an ISV service |
| ispid | Request parameter value: isp ID analyzed from sip_apiname | If sip_apiname = taobao.test.echo, then: ispid = taobao |
| userid | Request parameter value: username | Upon successfully logging in the login page provided by an ISP, the user invokes back to the token generating url of the SIP and sends the url to username of the ISP in the SIP |
| timestamp | Current time format in an SIP system: yyyy-mm-dd hh:mm:ss | Basis for determining whether a session has timed out or not |
| type | | Type of token<br>type = 0: session token, log in once, effective for the entire session as long as the session has not timed out.<br>type = 1: request token, login once, effective only once for a single request. |

IV. Implementation of Security Control Flow

Figure 3:
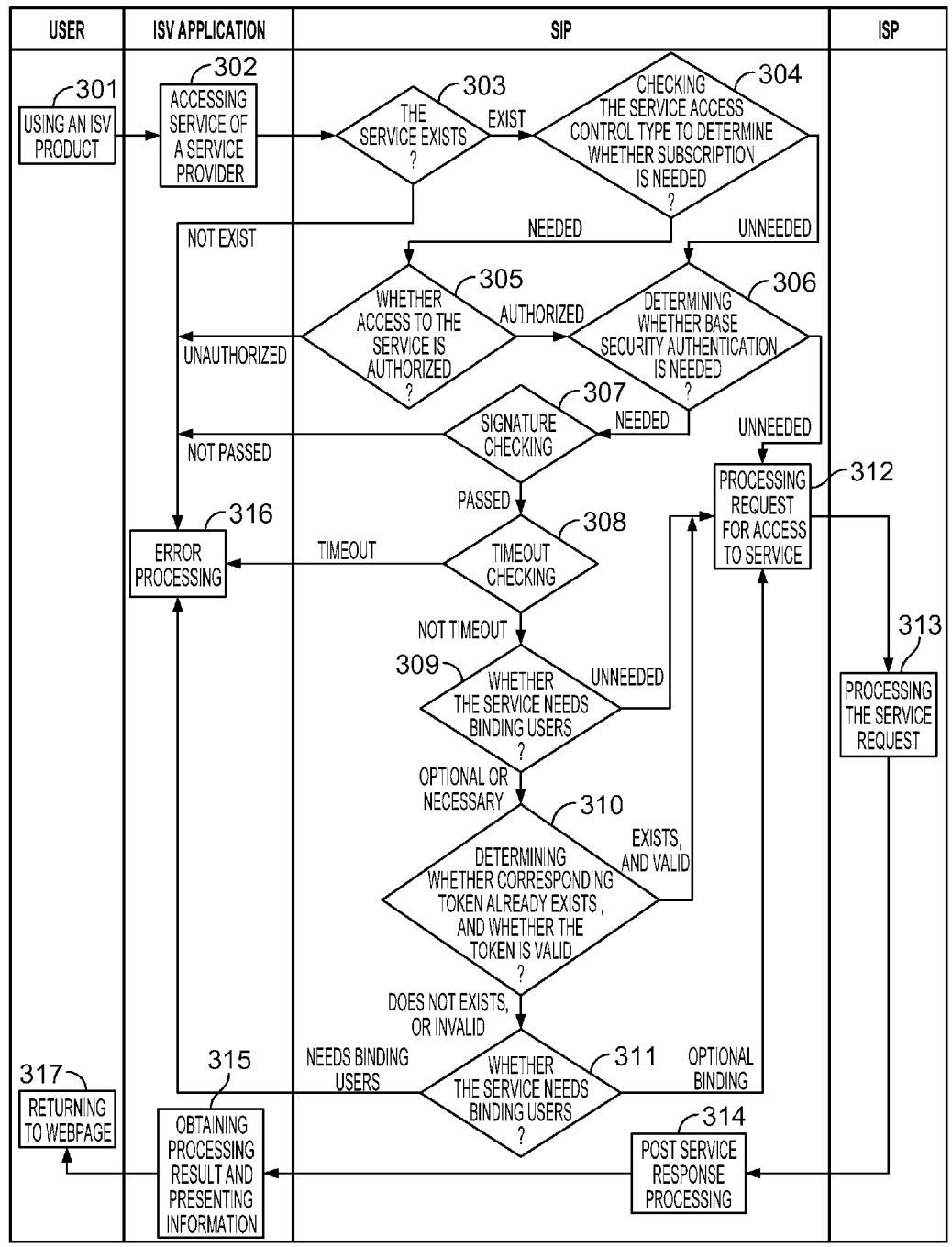
FIG. 3 is a flowchart illustrating an embodiment of a process of a security control flow.

FIG. 3 is a flowchart illustrating an embodiment of a process of a security control flow. In order to illustrate the implementation of the flow more clearly, the flow in FIG. 3 is arranged not only based on time, but also based on the parties involved in the process. The related parties include user(s), ISV applications, SIPs and ISPs, wherein the SIP refers to the Service Integration platform system. FIG. 3 also relates to management of tokens. In this example, a token is a kind of identity token. When a user is logged in, the identity of the user in an ISV system and the identity of the user in an SIP are associated. A user identity in an ISV system in every request can be associated with an SIP identity token that has already been generated. The SIP considers that an ISV application user with a token is authorized to operate user-related information of the ISP.

At 301, a user uses an ISV application.

At 302, a service request message is initiated and sent to an ISP via the ISV's application. Parameters provided in this step may include: appkey, sign, timestamp, apiname and sessionID. Other relevant business parameters can also be provided in this step.

The user uses an ISV application to initiate a service request. The ISV application determines whether signature is needed according to service level and sends the request to an SIP. The SIP in turn makes a request to the ISP.

At 303, it is determined whether the service exists. If yes, control is transferred to 304; otherwise, control is transferred to 316 for error processing. The parameter servicename carried in the message is checked to determine whether the service exists.

At 304, the service access control type is checked to determine whether subscription is needed. If yes, control is transferred to 305; otherwise, control is transferred to 306. In some embodiments, certain services provided by an ISP are not available to all ISVs to use freely and an ISV needs to send a request to the ISP to apply for use before using this kind of services. If the ISP accepts the request, a subscription record is generated. Before this kind of services is invoked, subscription relationship is checked first before other security strategies are checked. Whether this kind of subscription relationship exists can be checked through this step.

In 305, it is determined whether access to the service is authorized. If yes, control is transferred to 306, otherwise control is transferred to 316. This determination can be made through the relationship between the subscribed appkey and the subscribed API.

In 306, it is determined whether security authentication is needed. If yes, then control is transferred to 307, otherwise control is transferred to 312.

In 307, it is determined whether signature check is passed. If yes, then control is transferred to 308, otherwise control is transferred to 316.

In 308, it is determined whether the session has timed out. If yes, then control is transferred to 316, otherwise control is transferred to 309. Timeout checking can be done through timestamp parameters, tokens and the like. Set time length for timeout can be globally configured by the system.

In 309, it is determined whether the service needs to bind users. In some embodiments, whether user binding is required is decided at the time the service is registered, thus the service request would include information pertaining to whether binding is needed. If binding is optional or necessary, then control is transferred to 310, otherwise control is transferred to 312.

In this step, because invoking some services requires private information of a user using an ISV application, the user needs to perform Login operation through an ISP website. Then, the ISP will inform the SIP to bind the user information and the token issued by the SIP. Subsequent service requests for ISV applications only need to carry sessionID which can be changed into a user token of the SIP. When this kind of services is invoked, not only ISV identity but also user binding state is checked.

In 310, determining whether the token is in existence and valid. If the token exists and is valid, control is transferred to 312; else, control is transferred to 311. In this step, whether corresponding token already exists and whether the token is valid can be determined according to sessionID, service needed token type and ISP ID. Furthermore, if the token exists and is valid and this service employs a one-time-use user authentication mode, then the one-time-use token can be removed, i.e. it is verified that this application has been used.

In this step, the SIP can maintain cached relationships between the sessionID and a plurality of ISP token lists. Every ISP can be configured with a token timeout length to obtain configuration from the cache.

At 311, it is determined whether the service needs binding users. If yes, control is transferred to 316, otherwise control is transferred to 312. In this step, whether user binding is needed is determined before performing different security processing on optional user binding and necessary user binding.

At 312, the SIP processes request for access to service. In this step, the requested service is routed to the ISP to perform service processing.

At 313, the ISP processes the service request initiated by the user.

At 314, post service response processing, including, for example, recording log information and forwarding the response.

At 315, a processing result is obtained and information is presented by the ISV application.

At 316, error processing is performed. In this step, different responses can be made on different error information. For example, if user binding is needed, then corresponding binding user address and related information is returned. With other parameters checking errors, corresponding prompt is returned. In error processing, if user binding is needed, then Login page can be redirected to a Login Uniform Resource Locator (login url) that is provided by the SIP.

At 317, the ISV application directs the user's browser to return to webpage.

Accordingly, a user initiates a service request with an ISV application. The ISV application determines whether signature is needed according to service levels and sends the request to an SIP. Upon receiving the request, the SIP determines validity according to the name of the requested service and determines whether to check service access control cache according to the service access control type. When the accessed service security level is determined, the requested service is directly routed to an ISP service address for an anonymous access service level and basic security authentication shall be performed according to parameters carried by the request for other type of service level.

The SIP checks signature information and the timestamp and determines whether user authentication is needed according to service level. If user authentication is needed, then the SIP continues to check the user token.

In subsequent processes relevant user binding is determined in Step 309, because invoking some services requires binding of user information and the issued token, when this kind of services are invoked, besides verifying the ISV identity, user binding state is also to be checked. Accordingly, checking of token further includes checking whether sessionID of the ISV identifying user uniqueness is included in the parameters. If no, then user identity is considered not bound. That is, when it is determined that the business platform parameters include user session uniqueness identity in the ISV application, a user binding error is returned before passing service request authentication.

When determining business platform parameters including service ISP ID (ISP identity), identity proof for invoking ISV services and user session uniqueness identity in the ISV application, a token list in the cache is obtained. When it is determined that no token exists or the token is invalid, user binding error information can be returned. In some embodiments, service ISP ID+application Appkey+platform parameters of sessionID can be combined into a user token cached key and use the cached token lists to determine whether the token exists. In some embodiments, an application stores two types of tokens with different life cycles: one-time-use tokens and session tokens for services of different levels of a same ISP. If the token does not exist, it means that the user's identity is unbound.

If a token exists, then the type of the token is determined. For a request token (which can be used only once), the token is removed from the token cache and successful user identity checking is returned. For a session token, the generating time of the token and the current time are checked again to determine timeout.

Upon failure of authentication, an error prompt of needing user binding is returned to the ISV application and corresponding ISP Login page address is returned.

Upon success of authentication, the username is sent back as a parameter (the ISP can do further business logic checking according to this information) and routed to an ISP service address.

Figure 4:
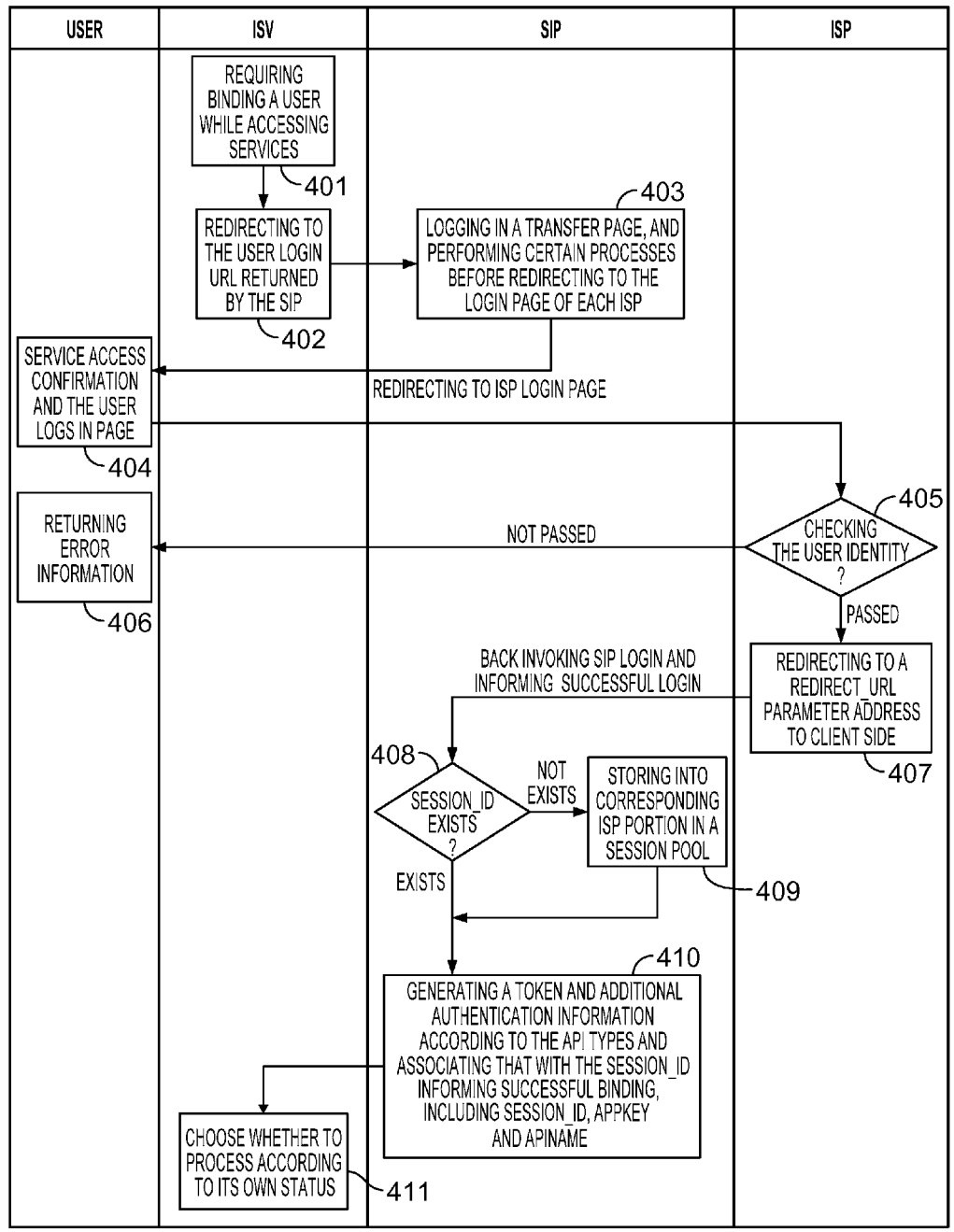
FIG. 4 is a flowchart illustrating an embodiment of a process for binding a user.

FIG. 4 is a flowchart illustrating an embodiment of a process for binding a user. In error processing in Step 316 of process 300, if user binding is needed, redirecting to the Login page is also needed. As shown in FIG. 4, the implementation flow of user binding and redirecting can be as follows:

At 401, an ISV is required to bind a user while accessing services.

At 402, the ISV is redirected to the user login URL returned by the SIP. The appkey, apiname, redirect_url and sessionID need to be sent as parameters. The URL that logs the user is the address returned in Step 316.

At 403, logging in a transfer page of the SIP and performing certain processes before redirecting to the login page of the ISP.

At 404, a user does service access confirmation and logs in. In this step, the user is required to enter appkey, apiname and sessionID, wherein sessionID is the user session uniqueness identity.

At 405, the ISP checks the user identity. If the checking is passed, control is transferred to 407; otherwise, control is transferred to 406.

At 406, error information is returned.

At 407, the request is redirect to a redirect_url parameter address, invoking SIP login. The SIP is informed upon successful login.

According to the address in the redirect_url parameter, the logged interface is redirected to this address, so that the user can directly jump to an address of the ISV upon seeing the logged page.

At 408, the SIP determines whether a sessionID exists, if yes, control is transferred to 410; otherwise, control is transferred to 409.

In specific implementation, ispID+appkey+sessionID can be checked as the real sessionID in the system. In this case, the checked contents includes the sessionID as well as ispID and appkey.

At 409, the SIP stores the sessionID into the corresponding ISP in a Session pool, and control is transferred to 410;

At 410, the SIP generates a token and additional authentication information according to the API types, and associates that with the sessionID, and informs the ISV that binding is success. The sessionID, appkey and apiname can be included in the informing message;

At 411, the ISV chooses whether to process according to its own status. For example, the ISV can mark that one sessionID has been bound with user information in its own system. This sessionID can be directly transferred to request services in subsequent service request without requesting binding identity again.

Accordingly, upon receiving a returned error indicating that user binding is required, the ISV is redirected to the Login page address returned by the SIP. The appkey, apiname (name of requested service), redirecturl (the url to be redirected to the ISV application passes user binding) and sessionID (user uniqueness identity) are to be included in the session at the same time.

Upon obtaining the login request, the SIP can redirect to the corresponding ISP Login address according to the apiname and transfer parameters.

The user can choose whether to login in the ISP Login page; the ISP login page can also determine whether the user was logged in according to approaches similar to cookies and whether to jump over the login step. This step mainly provides a login-free scheme. For example, a user was logged in the website and the website assigned a cookie as identity in the client side. If the user is transferred to the login page again during the course of service requesting, the login page checks whether such an indicator of having been logged in (i.e., the cookie) already exists to determine whether to jump over the login process directly.

Upon accomplishing the user login checking, the ISP can invoke the token issuance service of the SIP platform system, enter the appkey and sessionID and redirect to the redirect_url address transferred by the ISV application.

The SIP token issuance service generates a token according to token generating rules and stores the token into a cache by using ispID+appKey+sessionID as the key of the token.

The SIP invokes the back-invoking notice URL of the ISV application and informs of successful user binding. The ISV application determines whether to process the response according to demand.

Figure 5:
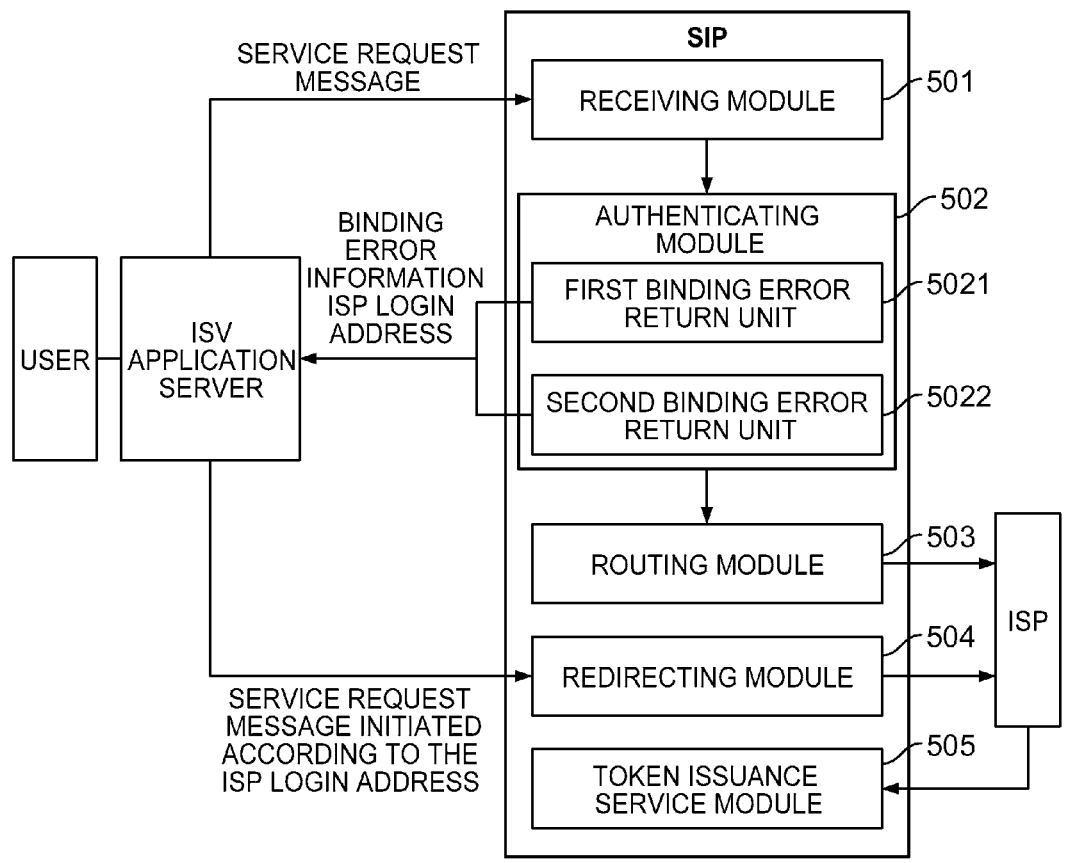
FIG. 5 is a schematic illustration of an embodiment of a service integration platform system for providing Internet services.

FIG. 5 is a schematic illustration of an embodiment of a service integration platform system for providing Internet services. In order to facilitate expression, the service integration platform system is referred to as an SIP. As shown in this example, the system comprises a user device such as a computer, a handheld/mobile device or the like, an ISV application server (or server cluster), an SIP network comprising one or more servers and an ISP network comprising one or more servers. The SIP network includes a receiving module 501 (e.g., a communication interface such as a port, cable, wire line or wireless network interface card) configured to receive a service request message initiated by the user with the ISV application to the ISP, wherein platform-level parameters for determining service API types are included in the service request message. Also included is an authenticating module 502 configured to authenticate the service request according to the platform-level parameters. Also included is a routing module 503 configured to route the service request initiated by the user with the ISV application to the service address of the ISP upon passing the service request authentication. The modules may be implemented using a variety of techniques, including as software comprising computer-executable instructions operating on one or more processors included in one or more computing devices such as servers, as firmware comprising special instructions such as microcode operating on programmable logic devices, as hardware such as Application Specific Integrated Circuits (ASICs), or a combination thereof.

Specifically, the authenticating module can perform one or a combination of signature check, timestamp check and user identity check. The platform-level parameters may include one or a combination of identity proof for invoking ISV services, service name, service request timestamp, signature, a user session uniqueness identity in the ISV application and type of returned value.

The authenticating module authenticates the service request according to the platform-level parameters as follows:

When the platform-level parameters are: identity proof for invoking the ISV service and a service name, the service request is not subjected to signature check and user identity check;

When the platform-level parameters are: identity proof for invoking the ISV service, service name, service request timestamp and signature, the service request is subjected to signature check, timestamp check and user identity check;

When the platform-level parameters are: identity proof for invoking the ISV service, service name, service request timestamp, signature and user session uniqueness identity in the ISV application, the service request is subjected to signature check, timestamp check and user identity check;

When the platform-level parameters are: identity proof for invoking the ISV service, service name, service request timestamp and signature, the service request is subjected to signature check, timestamp check and optional user identity check.

When user binding is needed, the authenticating module 502 can further comprise a first binding error return unit 5021 and/or a second binding error return unit 5022, wherein, The first binding error return unit 5021 is for determining that the business platform parameters include user session uniqueness identity in the ISV application and for returning user binding error information when the service request authentication failed to pass.

The second binding error return unit 5022 is for obtaining the token list in a cache when it is determined that the business platform parameters include a service ispID, identity proof for invoking the ISV service and user session uniqueness identity in the ISV application; and for returning user binding error information when it is determined that the token is not exist or is invalid.

Furthermore, the first binding error return unit and/or the second binding error return unit can also return the ISP login address while returning the user binding error information.

When returning the binding error information and the ISP login address to the user, the user can perform user binding again. In this case, the service integration platform system can further include a redirecting module 504 for redirecting to the ISP login address according to the service name in the platform-level parameters and transferring the platform-level parameters to the ISP, when receiving the service request message initiated by the ISV to the ISP login address upon receiving the user binding error information. The platform-level parameters in the service request message include identity proof for invoking the ISV service, service name, user session uniqueness identity in the ISV application and the address to be redirected to after user binding of the ISV application.

In this example, the SIP further includes a token issuance service module 505 for issuing the token according to the identity proof for invoking the ISV service and user session uniqueness identity in the ISV application transferred by the ISP after user login is verified by the ISP according to the user session uniqueness identity in the ISV application.

It can be seen from the above embodiments that a security control strategy that can integrate services provided by multiple service providers is provided in some embodiments. Through service level subdivision on signatures and encrypting logic designs and integration on platform-level parameters, the whole security flow design is achieved, thereby the Service Grading System is improved, user information security and ISP service access security is ensured, shortcomings of existing single ISP service security strategies are overcome. This security strategy is transparent to the ISV, so that the cost of ISV development is reduced and the ISV only needs to concern specific business services during developing. In the meantime, the ISP can focus on business service interface development and is not required to re-implement security strategy of business services.

It is obvious to those skilled in the art that various modifications and variations may be made to the present invention without departing from the spirit and scope of the invention. Thus, it is intended that all such modifications and variations are covered by the present invention if they fall within the scope of the claims and the equivalents thereof.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing web services with a service integration platform comprising:
    receiving a service request message that is initiated by a user of an application provided by an Independent Software Vendor (ISV), the service request message being implemented according to an Application Programming Interface (API) type and including a plurality of platform-level parameters that conform to the API type, wherein:
        the plurality of platform-level parameters comprise an Appkey associated with the application provided by the ISV;
        the Appkey is a parameter issued to the application provided by the ISV and is not modifiable by the application provided by the ISV; and
        the Appkey is a proof of identity that identifies the web services the application provided by the ISV is allowed to access;
    determining, using one or more computer processors, a set of authentication checks that correspond to and that are appropriate for the API type, wherein:
        the API type is one of a plurality of possible API types;
        for each possible API type there is a corresponding set of authentication checks;
        at least some API types map to different sets of authentication checks;
    performing authentication of the service request message according to the set of authentication checks; and
    routing the service request message to a service address of an Internet Service Provider (ISP) in the event that the service request message is authenticated, wherein the Internet Service Provider (ISP) is a provider of web services on the Internet;
    returning user binding error information;
    initiating a second service request message to a login address of the ISP upon receiving the user binding error information, wherein the second service request message includes as its platform-level parameters the Appkey associated with the application, a service name, a user session uniqueness identity in the Independent Software Vendor application and an address the Independent Software Vendor application to be redirected to upon passing user binding.

2. The method of claim 1, wherein the API type has a corresponding service level comprising an anonymity access type and the determined set of authentication checks includes zero elements.

3. The method of claim 1, wherein the plurality of platform-level parameters further comprises a service name.

4. The method of claim 1, wherein the API type has a corresponding service level comprising an authorized service type and the determined set of authentication checks includes a signature check and a timestamp check.

5. The method of claim 4, wherein the platform-level parameters for the authorized service type further comprises a service name, a service request timestamp, and a signature.

6. The method of claim 1, wherein the API type has a corresponding service level comprising a user authorized service type and the determined set of authentication checks includes a signature check, a timestamp check and a user identity check.

7. The method of claim 6, wherein the platform-level parameters for the user authorized service type further comprises a service name, a service request timestamp, a signature and a user session uniqueness identity in the ISV application.

8. The method of claim 1, wherein the API type has a corresponding security level comprising an optional user authorized service type and the determined set of authentication checks includes a signature check, a timestamp check, and optionally, a user identity check.

9. The method of claim 8, wherein the platform-level parameters for the optional user authorized service type further comprises a service name, a service request timestamp and a signature, and optionally a user session uniqueness identity in the ISV application.

10. The method of claim 1, wherein the set of authentication checks comprises one or more of the following: a signature check, a timestamp check and a user identity check.

11. The method of claim 1, wherein the platform-level parameters comprises one or more of the following: a service name, a service request timestamp, a signature, a user session uniqueness identity in the Independent Software Vendor application and a type of returned value.

12. The method of claim 1, wherein user binding error information is returned in the event that that the platform parameters include a user session uniqueness identity in the Independent Software Vendor application and the service request message authentication fails.

13. The method of claim 1, further comprising:
maintaining a token list in a cache in the event that the platform parameters include service Internet Service Provider identity, the Appkey associated with the application, and user session uniqueness identity in the Independent Software Vendor application;
determining whether a token exists and is valid; and
returning user binding error information in the event that no token exists or the token is invalid.

14. A service integration platform system for providing web services comprising:
an interface configured to receive a service request message that is initiated by a user of an application provided by an Independent Software Vendor (ISV), the service request message being implemented according to an Application Programming Interface (API) type and a plurality of platform-level parameters that conform to the API type, wherein:
the plurality of platform-level parameters comprise an Appkey associated with the application provided by the ISV;
the Appkey is a parameter issued to the application provided by the ISV and is not modifiable by the application provided by the ISV; and
the Appkey is a proof of identity that identifies the web services the application provided by the ISV is allowed to access; and
one or more processors coupled to the interface, configured to:
determine a set of authentication checks that correspond to and that are appropriate for the API type, wherein:
the API type is one of a plurality of possible API types;
for each possible API type there is a corresponding set of authentication checks;
at least some API types map to different sets of authentication checks;
perform authentication of the service request according to the set of authentication checks; and
route the service request to a service address of an Internet Service Provider (ISP) in the event that the service request is authenticated, wherein the Internet Service Provider (ISP) is a provider of web services on the internet;
return user binding error information;
initiate a second service request message to a login address of the ISP upon receiving the user binding error information, wherein the second service request message includes as its platform-level parameters the Appkey associated with the application, a service name, a user session uniqueness identity in the Independent Software Vendor application and an address the Independent Software Vendor application to be redirected to upon passing user binding.

15. The system of claim 14, wherein the API type has a corresponding service level comprising an anonymity access type and the set of determined authentication checks includes zero elements.

16. The system of claim 14, wherein the plurality of platform-level parameters further comprises a service name.

17. The system of claim 14, wherein the API type has a corresponding service level comprising an authorized service type and the determined set of authentication checks includes a signature check and a timestamp check.

18. The system of claim 17, wherein the platform-level parameters for the authorized service type further comprises a service name, a service request timestamp and a signature.

19. The system of claim 14, wherein the API type has a corresponding service level comprising a user authorized service type and the determined set of authentication checks includes a signature check, a timestamp check and a user identity check.

20. The system of claim 19, wherein the platform-level parameters for the user authorized service type further comprises a service name, a service request timestamp, a signature and a user session uniqueness identity in the ISV application.

21. The system of claim 14, wherein the API type has a corresponding service level comprising an optional user authorized service type and the determined set of authentication checks includes a signature check, a timestamp check and optionally, a user identity check.

22. The system of claim 21, wherein the platform-level parameters for the optional user authorized service type further comprises a service name, a service request timestamp and a signature, and optionally a user session uniqueness identity in the ISV application.

23. The system of claim 14, wherein the set of authentication checks comprises one or more of the following: a signature check, a timestamp check and a user identity check.

24. The system of claim 14, wherein the platform-level parameters comprises one or more of the following: a service name, a service request timestamp, a signature, a user session uniqueness identity in the Independent Software Vendor application and a type of returned value.

25. The system of claim 14, wherein user binding error information is returned in the event that that the platform parameters include a user session uniqueness identity in the Independent Software Vendor application and the service request message authentication fails.

26. The system of claim 14, wherein the one or more processors are further configured to:
maintain a token list in a cache in the event that the platform parameters include service Internet Service Provider identity, an Appkey associated with the application and user session uniqueness identity in the Independent Software Vendor application;
determine whether a token exists and is valid; and
return user binding error information in the event that no token exists or the token is invalid.

* * * * *